UNITED STATES PATENT OFFICE.

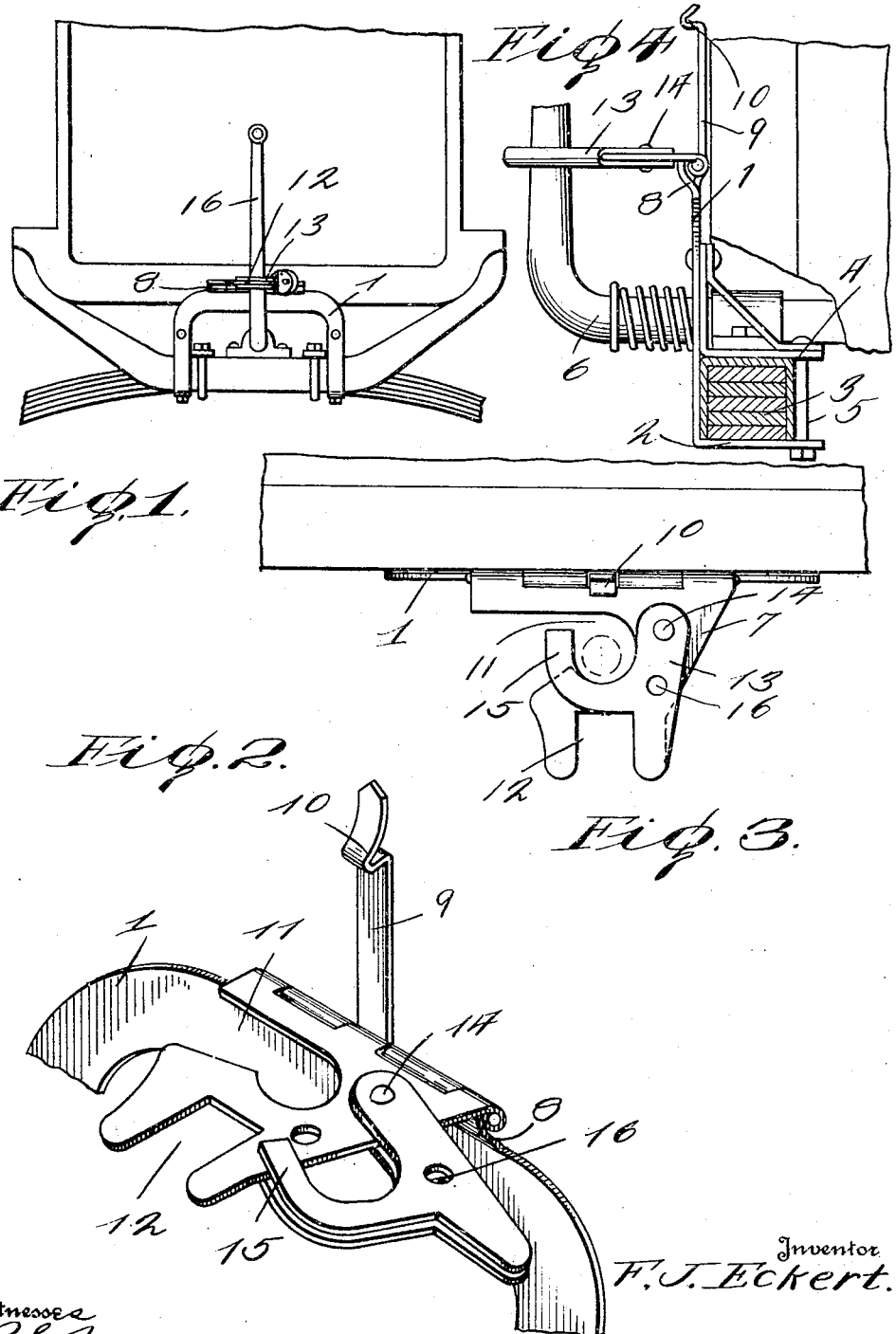

FRANK J. ECKERT, OF LORETTO, NEBRASKA.

LOCK FOR ENGINE-STARTING CRANKS.

1,258,323.           Specification of Letters Patent.        Patented Mar. 5, 1918.

Application filed January 29, 1917. Serial No. 145,189.

*To all whom it may concern:*

Be it known that I, FRANK J. ECKERT, a citizen of the United States, residing at Loretto, in the county of Boone, State of Nebraska, have invented certain new and useful Improvements in Locks for Engine-Starting Cranks; and I do hereby declare the following to be a full, clear, and exact description of the invention, such as will enable others skilled in the art to which it appertains to make and use the same.

The present invention relates to locks for engine starting cranks.

The object of the invention is to provide a device of this character which can be easily and quickly attached to an automobile in convenient relation to the starting crank so that the latter can be firmly locked to prevent an unauthorized person from starting the engine.

A further object of the invention is to provide a device of this type where the locking plate can be also utilized as a supporting plate for engaging the crank after the engine has been started to hold the crank in an elevated position so as to prevent the objectionable swinging to which the cranks are subjected when hanging down.

With these and other objects in view, my invention will now be fully set forth and described, reference being had to the accompanying drawings.

In the drawings:—

Figure 1 is a fragmentary front elevation of an automobile equipped with the device, and showing the crank locked, Fig. 2 is a detail perspective view of the device in open position, Fig. 3 is a plan view showing a crank shank locked therein, and Fig. 4 is a partial sectional view showing the crank engaged for running position.

Referring more particularly to the drawings, 1 represents a bracket plate which is shaped substantially as an inverted U, and has its free ends terminating in horizontal feet 2 which engage under the front spring 3 of the automobile upon opposite sides of the chassis connection, said feet 2 coöperating with angle-brackets 4 secured to the arms of the bracket 1 to secure the latter to the spring 3, bolts 5 being passed therethrough behind the spring. The bracket plate 1 overlies the crank 6, and has its looped portion located in the front of the radiator.

Hingedly connected to the upper edge of the bracket plate 1 is a supporting or locking plate 7, the hinged relation being such that the plate 7 may be swung in the vertical or dropped forwardly into a horizontal position where it is supported at right angles to the plate 1. In order to cause the plate 7 to project in a substantially normal right-angular relation to the plate 1, the latter is provided with the lugs 8 adjacent the hinged portions of the plate 7, so that the latter will be held up by said lugs in its horizontal position. At a preferably central point, the plate 1 carries as an extention thereof, the spring finger 9 which has the latch loop 10 which will snap over a free edge of the supporting plate 7 when the latter is carried into vertical position in order to lock it out of the way of the crank 6 when the latter is being operated to start the engine. The locking plate 7, as best shown in Figs. 2 and 3 consists of an irregularly conformed element which has at one side a notch 11 which is let in from the left edge of the plate and is furthermore located in the vertical plane in which the crank rotates when pushed inwardly so that the clutch member of the crank engages the engine shaft. Also formed in the plate 7 and entered from the front edge thereof is the notch 12 which lies, when the plate 7 extends horizontally, in the vertical plane in which the crank handle normally extends when swinging free of the crank shaft of the engine, so that when the crank is not in use, it may be swung into its upwardly projecting position, and the plate 7 thrown into horizontal position with the sides of the recess 12 engaging the opposite sides of the crank shank as best illustrated in Fig. 3.

Mounted upon the plate 7 in pivotal relation thereto, is the locking device 13 which consists preferably of a stamped metal plate which is turned upon itself into complementary leaves which are spaced apart to freely receive therebetween the plate 7, the closed portion of the locking device 13 being adapted to seat against the right hand edge of the plate 7. The locking device 13 is pivotally secured to the plate 7 as by means of the rivet or bolt 14, and has extending therefrom the substantially right-angular or curvilinear fingers 15 which, when the locking device is folded upon the plate 7 extend across the mouth of the recess or notch 11, so that when the crank 6 extends through the notch, the fingers 15 will lock the crank in the recess. Registering apertures 16 formed through the locking element 13 and the plate 7 provide a means for a seal or lock by means of which the crank may be secured against unauthorized manipulation.

The use of my improved device will be evident from the foregoing, but it should be noted that it embodies a two-fold function, first, that of locking the crank in coupled position with the engine shaft, so that not only is it impossible to start the engine from the crank but also from any self-starter which may be installed upon the engine. The second function is embodied in the use of the notch 12 for preventing the swinging and rattling of the crank handle when the engine is running and the crank stands idly. Furthermore, while the device is readily accessible for either of the uses above described, it is also readily positioned out of the way of the operator when he desires to crank the engine by the snapping engagement with the spring element 9.

What I claim as my invention is:—

1. A starting crank lock, comprising a plate, means for detachably connecting the plate to an automobile, a second plate hingedly connected to the first named plate, the second named plate having a recess formed therein for engaging the crank to hold it in coupled position and having a second recess for holding the crank in an elevated position when in its inoperative position and means for locking the crank in the first recess.

2. A starting crank lock, comprising a plate, means for detachably connecting the plate to an automobile, a second plate hinged to the first named plate and having a recess formed therein for engaging the crank to hold it in coupled position, the second named plate having also a recess for holding the crank in an elevated position when in its inoperative position, and a lock plate pivoted on the second plate and having arms above and below the latter to be swung across the open side of the first defined recess to lock the crank in coupled position.

In testimony whereof, I affix my signature, in the presence of two witnesses.

FRANK J. ECKERT.

Witnesses:
E. J. MIILLE,
R. B VAN FLEET.

Copies of this patent may be obtained for five cents each, by addressing the "Commissioner of Patents, Washington, D. C."